(12) United States Patent
von Wolff et al.

(10) Patent No.: US 6,805,905 B2
(45) Date of Patent: Oct. 19, 2004

(54) METHOD FOR APPLYING HOT-MELT PRESSURE SENSITIVE ADHESIVES TO A BACKING MATERIAL

(75) Inventors: Axel von Wolff, Hamburg (DE); Stefan Godersky, Hamburg (DE); Robert Mayan, Buxtehude (DE); Andreas B. Kummer, Hamburg (DE)

(73) Assignee: Beiersdorf AG, Hamburg (DE)

( * ) Notice: Subject to any disclaimer, the term of this patent is extended or adjusted under 35 U.S.C. 154(b) by 360 days.

(21) Appl. No.: 09/915,715

(22) Filed: Jul. 26, 2001

(65) Prior Publication Data

US 2002/0035963 A1 Mar. 28, 2002

(30) Foreign Application Priority Data

Aug. 20, 2000 (DE) .......................................... 100 37 549

(51) Int. Cl.[7] .................................................. B05D 5/10
(52) U.S. Cl. .............................. 427/208.2; 427/208.4; 427/208.6; 427/271; 427/359
(58) Field of Search ........................... 427/208.2, 208.4, 427/208.6, 271, 359

(56) References Cited

U.S. PATENT DOCUMENTS

| | | | |
|---|---|---|---|
| 4,192,785 A | 3/1980 | Chen et al. | 260/17.4 |
| 4,253,460 A | 3/1981 | Chen et al. | 128/283 |
| 4,938,835 A | 7/1990 | Ludwig | 156/555 |
| 5,122,219 A | 6/1992 | Ludwig | 156/379.6 |
| 6,180,229 B1 * | 1/2001 | Becker et al. | 428/355 BL |

FOREIGN PATENT DOCUMENTS

| | | | |
|---|---|---|---|
| CH | 648 497 | 3/1985 | ............ B05C/1/08 |
| DE | 28 25 195 | 12/1978 | ............ A61L/15/06 |
| DE | 42 31 743 | 3/1994 | ............ B05C/1/10 |
| DE | 198 06 609 | 8/1999 | ............ C09J/201/00 |
| EP | 0 356 777 | 3/1990 | ............ C09J/7/02 |
| EP | 0 384 278 | 8/1990 | ............ B05C/1/10 |
| EP | 0 565 133 | 10/1993 | ............ B05C/1/10 |
| EP | 0 622 127 | 11/1994 | ............ B05C/1/08 |
| EP | 0 675 183 | 10/1995 | ............ C09J/5/00 |
| WO | WO 88/03432 | 3/1988 | ............ B05C/5/04 |

OTHER PUBLICATIONS

English–language abstract of DE 4 231 743, dated Mar. 24, 1994.
English–language abstract of CH 648 497, dated Mar. 29, 1985.
English–language abstract of EP 0 565 133, dated Mar. 10, 1993.

* cited by examiner

Primary Examiner—Bernard Pianalto
(74) Attorney, Agent, or Firm—Norris McLaughlin & Marcus

(57) ABSTRACT

A method of partially applying a hot-melt pressure sensitive adhesive composition to a backing material, in which the hot-melt pressure sensitive adhesive composition is applied by an applicator to a moving transfer means in such a way that a film formed from the hot-melt adhesive composition comprises voids;

the film applied to the transfer means is subsequently applied to a backing material, which is likewise moving.

7 Claims, 2 Drawing Sheets

METHOD FOR APPLYING HOT-MELT PRESSURE SENSITIVE ADHESIVES TO A BACKING MATERIAL

The invention relates to methods of partially applying a hot-metal pressure sensitive adhesive composition to a backing material.

BACKGROUND OF THE INVENTION

Substrates coated with highly viscous materials are known in the medical sector. From certain standpoints it is sensible for these coatings not to have impervious surfaces but instead to be applied in the form of dots, which allows, for example, the skin under bandages not to macerate, owing to the possibility for perspiration and other skin excretions to depart. An appropriate method for achieving this dot-form coating is that of rotary screen printing.

In this method, there is a rotating screen within which is located a nozzle, by means of which the fluid to be applied is introduced from the outside into the screen chamber and pressed through the screen perforations in the direction of the substrate to be coated. The screen is lifted from the substrate in accordance with the rate of transportation of the substrate (rotary speed of the screen drum). As a consequence of the adhesion and the internal cohesion of the fluid, the limited supply of hot-melt adhesive composition in the perforations is drawn in sharp definition from the base of the domes that is already adhering to the backing, and is conveyed onto the backing by the prevailing pressure.

After the end of this transportation, the more or less strongly curved surface of the dome forms over the specified base area, in dependence on the rheology of the fluid. The height-to-base ratio of the dome depends on the ratio of the perforation diameter to the wall thickness of the screen drum and on the physical properties (rheology, surface tension and contact angle on the backing material) of the fluid.

Numerous substrate materials based on films, wovens, knits, nonwovens, gels or foams have already been disclosed and are also employed in practice. In the medical sector there are particular requirements imposed on the backing materials. The materials are required to be skin compatible, generally permeable to air and/or water vapor, and also readily modelable and conforming. On the basis of these requirements, a very thin or soft backing is frequently preferred. For handling and in use, however, the backing materials are also required to be of sufficient strength and possibly of limited extensibility. Furthermore, the backing material should retain sufficient strength and low extensibility even after becoming wet through.

In the textile industry it is also known that partial coatings may be transferred. EP 0 675 183 A1 describes a process which transfers hot-melt adhesive geometries onto a specially crosslinked substrate. An intermediate backing which has been rendered dehesive is likewise mentioned in EP 0 356 777 A1. The use of a coated counterpressure roll as auxiliary backing for the transfer is also described (CH 648 497 A5), where self-adhesive products are not addressed.

The design of nozzle and screen is described fundamentally in CH 648 497 A5; improvements of the process are described in EP 0 288 541 A1, EP 0 565 133 A1, EP 0 384 278 A1, and DE 42 31 743 A1.

It is known, furthermore, from EP 0 622 127 B1 that pressure sensitive, solvent free adhesive films are applied to a substrate via a roller. Single channel or multichannel nozzles are employed as applicator units.

Owing to an applied difference in speed between the coated roller or the decreasing substrate, the metered film of adhesive is reduced in its thickness, so that thin films of pressure sensitive adhesive may be transferred to substrates. However, value is always placed on the fact that the thin films of pressure sensitive adhesive are impervious, without voids, in order to ensure uniform quality of the product.

Another common feature, especially with coatings of medical backing materials, is to provide the backing with an impervious film of composition which is subsequently perforated—in an additional process step—by means of compressed air, spike rollers or lasers.

It is an object of the invention to provide a method that is outstandingly suited to apply a hot-melt pressure sensitive adhesive to a backing material in such a way that the backing material thus coated, when employed as a plaster, has improved properties in respect of breathing activity or water vapor permeability.

This object is achieved by a method as described in the main claim. The subsidiary claims relate to advantageous developments of the subject matter of the invention.

SUMMARY OF THE INVENTION

The invention accordingly describes a method of partially applying a hot-melt pressure sensitive adhesive composition to a backing material, in which the hot-melt pressure sensitive adhesive composition is applied by an applicator to a moving transfer means in such a way that a film formed from the hot-melt adhesive composition comprises voids;
the applied film is subsequently applied to a backing material, which is likewise moving.

Figure 1:
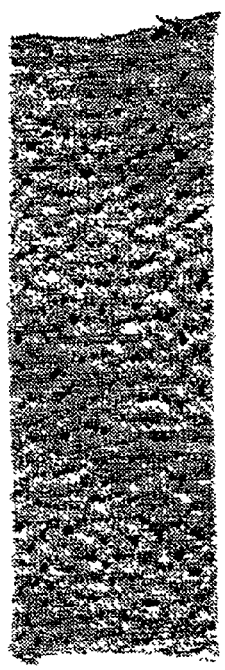
FIGS. 1 to 4 show photographic reproductions of different samples manufactured by the method according to the invention. A hot-melt pressure sensitive adhesive composition was applied to a moving transfer means by means of an applicator in such a way that the film formed from the hot-melt adhesive composition has voids.

The subject matter of the invention, then, comprises a method of partially applying a hot-melt pressure sensitive adhesive composition to a backing material, in which the hot-melt pressure sensitive adhesive composition is applied by means of an applicator to a moving backing material in such a way that a film formed from the hot-melt adhesive composition comprises voids.

It is particularly advantageous for the applicator to be configured in the form of a slot die or rolling rod die and/or for the transfer means to be configured in the form of a roll.

DETAILED DESCRIPTION

In the course of the transfer of the film of composition to a moving backing material or a transfer means, the film of composition undergoes mechanical loading. In particular, tensile forces and shear forces occur which are proportional to the difference in speed between the flow of composition and the backing material or transfer means. These forces which occur are adjusted, through the choice of the method parameters, in such a way that the film of composition is extended beyond its yield point, and tears.

The tensile strength and elongation at break of a film of viscoelastic hot-melt pressure sensitive adhesive depend on a large number of parameters. The range of forces by means of which a coating pattern in accordance with the invention is achieved may be delimited as follows:

Where the forces which occur as a result of difference in speed are too low, the film of composition is merely extended and stretched without voids being produced.

Where the forces which occur are too high, the film of composition is torn off completely and individual, discrete pieces of composition are deposited on the backing material or transfer means.

Within the "window" thus defined it is possible to adjust the fraction of surface area covered with composition to uncovered surface area through the choice of the method parameters, especially the difference in speed.

The size and position of this "window" are determined by the following parameters of the coating method:

viscoelastic properties of the hot-melt pressure sensitive adhesive
temperature of the hot-melt pressure sensitive adhesive
temperature of the backing material or transfer means
spatial arrangement of the applicator relative to counterpressure roll or transfer means
geometry of the applicator
flow rate of the hot-melt pressure sensitive adhesive
web speed of the backing material and/or speed of the transfer means.

It is advantageous to use thermoplastic hot-melt adhesive compositions based on natural and synthetic rubbers and on other synthetic polymers such as, by way of example, acrylates, methacrylates, polyurethanes, polyolefins, polyvinyl derivatives, polyesters or silicones, with appropriate additives such as tackifier resins, plasticizers, stabilizers and other auxiliaries where necessary.

Their softening point should be higher than 50° C., since the application temperature is generally at least 90° C., preferably between 100° C. and 180° C., or between 180° C. and 220° C. in the case of silicones. If desired, postcrosslinking by irradiation with UV or electron beams may be appropriate in order to set particularly advantageous properties in the hot-melt adhesive compositions.

Hot-melt adhesive compositions based on block copolymers, in particular, are notable for their diverse possibilities for variation, since the controlled reduction in the glass transition temperature of the self-adhesive composition as a result of the selection of the tackifiers, plasticizers, polymer molecule size and molecular weight distribution of the ingredients ensures the required bonding to the skin in a manner appropriate to their function, even at critical points of the human locomotor system.

For especially strongly adhesive systems, the hot-melt adhesive composition is based preferably on block copolymers, especially A-B, A-B-A block copolymers or blends thereof. The hard phase A is principally polystyrene or its derivatives and the soft phase B comprises ethylene, propylene, butylene, butadiene, isoprene or mixtures thereof, with particular preference ethylene and butylene or mixtures thereof.

Polystyrene blocks may, however, also be present in the soft phase B, in amounts of up to 20% by weight. The overall styrene fraction should, however, always be less than 35% by weight. Preference is given to styrene fractions of between 5% by weight and 30% by weight, since a relatively low styrene fraction makes the adhesive composition more conforming.

The deliberate blending of diblock and triblock copolymers is particularly advantageous, preference being given to a diblock copolymer fraction of less than 80% by weight.

In one advantageous embodiment, the hot-melt adhesive composition is made up as indicated below:

| | |
|---|---|
| 10% by weight to 90% by weight | block copolymers, |
| 5% by weight to 80% by weight | tackifiers such as oils, waxes, resins and/or mixtures thereof, preferably mixtures of resins and oils, |
| less than 60% by weight | plasticizers, |
| less than 15% by weight | additives, |
| less than 5% by weight | stabilizers. |

The aliphatic or aromatic oils, waxes and resins used as tackifiers are preferably hydrocarbon oils, waxes and resins, the consistency of the oils, such as paraffinic hydrocarbon oils, or of the waxes, such as paraffinic hydrocarbon waxes, accounting for their favorable effect on bonding to the skin. Plasticizers used include medium-chain or long-chain fatty acids and/or their esters. These additions serve to set the adhesive properties and the stability. If desired, further stabilizers and other auxiliaries are employed.

Filling the adhesive composition with mineral fillers, fibers or hollow or solid microbeads is possible.

On medical backing materials, in particular, stringent requirements are imposed with regard to the adhesive properties. For ideal use, the hot-melt adhesive composition should possess a high tack. There should be functionally appropriate bond strength to the skin and to the reverse of the backing. So that there is no slipping, the hot-melt adhesive composition is also required to exhibit high shear strength. The deliberate reduction in the glass transition temperature of the adhesive composition as a consequence of the selection of the tackifiers, plasticizers, polymer molecule size and molecular distribution of the ingredients achieves the necessary functionally appropriate bonding to the skin and to the reverse of the backing. The high shear strength of the adhesive composition is achieved by virtue of the high cohesiveness of the block copolymer. The good tack is a result of the range of tackifiers and plasticizers employed.

Product properties such as tack, glass transition temperature and shear stability may be quantified effectively using a dynamomechanical frequency measurement. In this case, use is made of a rheometer controlled by shearing stress.

The results of this measurement method give information on the physical properties of a substance by taking into account the viscoelastic component. In this instance, at a specified temperature, the hot-melt adhesive composition is set in oscillation between two plane-parallel plates at variable frequencies and with low deformation (linear viscoelastic region). Via a pickup control unit, with computer assistance, the quotient (Q=tan δ) between the loss modulus (G", viscous component) and the storage modulus (G', elastic component) is found.

$$Q = \tan \delta = G''/G'$$

A high frequency is chosen for the subjective sensing of the tack, and a low frequency for the shear strength.

A high numerical value denotes better tack and poorer shear stability.

The glass transition temperature is the temperature at which amorphous or partially crystalline polymers undergo transition from the liquid or rubber-elastic state to the hard-elastic or glassy state, or vice versa (Römpp Chemie-Lexikon, 9th ed., volume 2, page 1587, Georg Thieme Verlag Stuttgart-New York, 1990). It corresponds to the maximum of the temperature function at a specified frequency.

For medical applications in particular, a relatively low glass transition point is required.

| Designation | $T_g$ [0.1 rad s$^{-1}$] low frequency | Conformability low frequency/RT [0.1 rad s$^{-1}$] | Tack high frequency/RT [100 rad s$^{-1}$] |
| --- | --- | --- | --- |
| Hot-melt adhesive composition A | −8 ± 2° C. | tan δ = 0.59 ± 0.03 | tan δ = 1.87 ± 0.03 |
| Hot-melt adhesive composition B | −12 ± 2° C. | tan δ = 0.17 ± 0.03 | tan δ = 1.68 ± 0.03 |

The hot-melt adhesive compositions are preferably formulated so that at a frequency of 0.1 rad/s they have a dynamic-complex glass transition temperature of less than 15° C., preferably from 5° C. to −30° C., with very particular preference from −3° C. to −15° C.

In accordance with the invention, preference is given to hot-melt adhesive compositions for which the ratio of the viscous component to the elastic component at a frequency of 100 rad/s and 25° C. is more than 0.7, in particular between 1.0 and 5.0, or hot-melt adhesive compositions for which the ratio of the viscous component to the elastic component at a frequency of 0.1 rad/s and 25° C. is less than 0.9, preferably between 0.7 and 0.02, with very particular preference between 0.6 and 0.1.

Suitable backing materials include all rigid and elastic sheetlike structures of synthetic and natural raw materials. Preference is given to backing materials which, following the application of the adhesive composition, may be employed in such a way that they fulfill the technical requirements or characteristics of a functional dressing. Examples include textiles such as wovens, knits, lays, nonwovens, laminates, nets, films, foams and papers. In addition, these materials may be pretreated and/or aftertreated. Common pretreatments are corona and hydrophobing; customary aftertreatments are calendering, thermal conditioning, laminating, punching and covering.

Subsequent calendering of the coated product and/or pretreatment of the backing, such as corona irradiating, for better anchoring of the adhesive film may also be advantageous.

Furthermore, treating the hot-melt adhesive composition by electron beam postcrosslinking or by UV irradiation may lead to an improvement in the desired properties.

The backing material is preferably coated at a speed of more than 2 m/min, preferably from 20 to 200 m/min.

The percentage fraction of the area coated with the hot-melt adhesive composition should be at least 30% and may extend up to approximately 99%, for specific products preferably from 40% to 95%, with particular preference from 50% to 92%. This may be achieved, if desired, by means of multiple application, with the possible use if desired of hot-melt adhesive compositions having different properties.

The partial application makes it possible for the transepidermal water loss to be dissipated through regulated channels, and improves the evaporation of perspiration from the skin, especially when the backing materials used are permeable to air and water vapor. This prevents skin irritations induced by instances of buildup of body fluids. The dissipation channels employed allow such fluids to be conducted away even when a multi-ply dressing is used.

In one preferred embodiment of the method of the invention, the backing material thus coated has an air permeability of more than 1 cm$^3$/(cm$^2$*s), preferably from 10 to 250 cm$^3$/(cm$^2$*s), and/or a water vapor permeability of more than 500 g/(m$^2$*24 h), preferably from 1000 to 5000 g/(m$^2$*24 h).

In another preferred embodiment of the method of the invention, the backing material thus coated, on steel, has a bond strength to the reverse of the backing of at least 0.5 N/cm, particularly a bond strength of between 2 N/cm and 20 N/cm.

The epilation of corresponding body regions and the transfer of composition to the skin are negligible owing to the high cohesiveness of the adhesive, which does not anchor itself to skin and hair; instead, the anchoring of the adhesive composition to the backing material, at up to 20 N/cm (sample width), is good for medical applications.

The outstanding properties of the self-adhesive backing material of the invention suggests its use for medical products, especially plasters, medical fixings, wound coverings, active substance systems, orthopedic or phlebological bandages and dressings.

Finally, after the coating operation, the backing material may be covered with an antiadhesive backing material, such as siliconized paper, or may be provided with a wound pad or padding.

It is especially advantageous if the backing material is sterilizable, preferably by means of gamma rays. Particularly suitable for subsequent sterilization, accordingly, are hot-melt adhesive compositions based on block copolymers which contain no double bonds. This applies particularly to styrene-butylene-ethylene-styrene block copolymers or styrene-butylene-styrene block copolymers. In this case there are no changes in adhesive properties that would be significant for the application.

Using a number of figures, advantageous embodiments of the subject matter of the invention will be shown, without wishing to restrict the invention unnecessarily as a result.

The applicator comprised a nozzle and the transfer means a roll. The nozzle may be set so that the nozzle gap is located precisely above the roll, i.e., the roll axis and the nozzle gap are situated within the vertically aligned plane through the roll axis (referred to as "against roll" coating).

The nozzle may also be taken up to the roll in such a way that the nozzle is not positioned precisely above the roll, i.e., the nozzle gap in the roll axis are situated in a plane which is at an angle to the vertically aligned plane (referred to as "off roll" coating). Furthermore, the nozzle may be arranged at a certain angle of inclination.

In the figures, a viscose backing was provided directly with a partial application of hot-melt pressure sensitive adhesive (HMPSA).

The parameters chosen were as follows:

Applicator: rolling rod die (from Bematec)

HMPSA: Durotak H 1505 (National Starch & Chemical)

Nozzle position: 6 o'clock

Backing material: 100% viscose, thickness 100 μm

Gap: 2 mm

Backing material temperature: 50° C.

The parameters varied within FIGS. 1 to 4 were as follows:

FIG. 1:

| | |
| --- | --- |
| Nozzle position: | against roll |
| HMPSA temperature: | 110 to 115° C. |
| Web speed: | 10 m/min |

-continued

Figure 2:
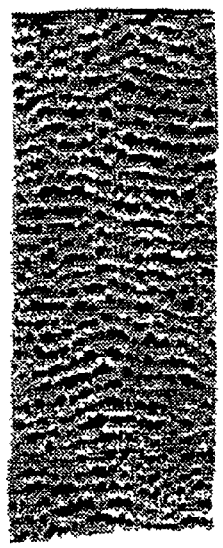
Figure 3:
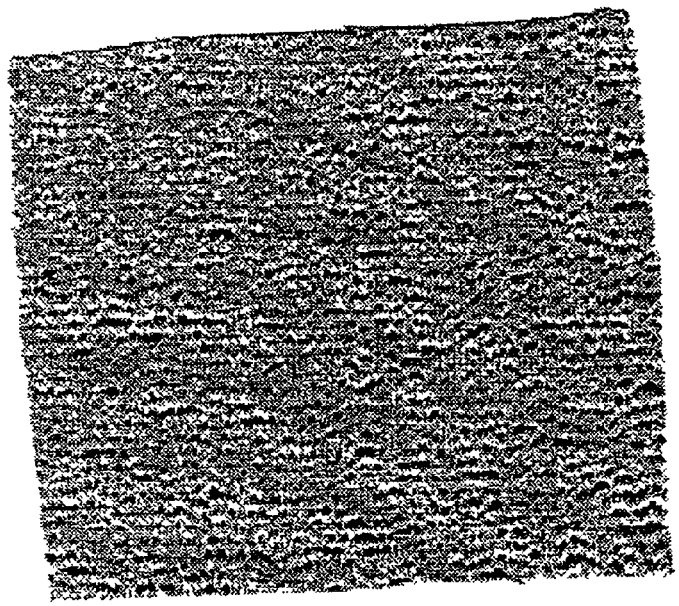
Figure 4:
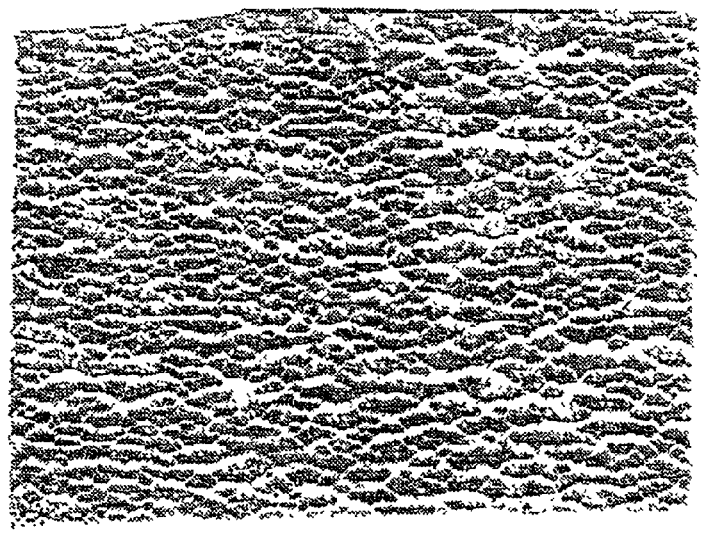

| | |
|---|---|
| HMPSA application: | 60 g/m² |
| FIG. 2: | |
| Nozzle position: | against roll |
| HMPSA temperature: | 110 to 115° C. |
| Web speed: | 5 m/min |
| HMPSA application: | 80 g/m² |
| FIG. 3: | |
| Nozzle position: | off roll |
| HMPSA temperature: | 140° C. |
| Web speed: | 30 m/min |
| HMPSA application: | 90 g/m² |
| FIG. 4: | |
| Nozzle position: | against roll |
| HMPSA temperature: | 110° C. |
| Web speed: | 5 m/min |
| HMPSA application: | 40 g/m² |

Depending on the selected combination of parameters, each backing material received a film of the hot-melt adhesive composition with different kinds of voids. On the one hand there were voids which had the form of holes; on the other hand netlike structures of voids were formed, with the HM PSA being arranged outside the net.

When used as plasters, all backing materials produced by the method of the invention had improved properties with regard to breathing activity and/or water vapor permeability which the skilled worker could not have expected.

What is claimed is:

1. A method of applying a hot-melt pressure sensitive adhesive composition to a backing material which comprises
   a) applying a hot-melt pressure sensitive adhesive to a moving transfer material at a rate, relative to the speed of the moving transfer material, that causes the applied hot-melt pressure sensitive adhesive to form a film on said moving transfer material, and said film to be torn as it is being formed, thereby resulting in a film which comprises voids, and
   b) transferring the film so formed from said moving transfer material to a moving backing material.

2. A method of applying a hot-melt pressure sensitive adhesive composition to a backing material which comprises applying a hot-melt pressure sensitive adhesive to a moving backing material at a rate, relative to the speed of the moving backing material, that causes the applied hot-melt pressure sensitive adhesive to form a film on said moving backing material, and said film to be torn as it is being formed, thereby resulting in a film which comprises voids.

3. The method as claimed in claim 1 or 2, wherein said hot-melt pressure sensitive adhesive is applied to said moving transfer material or said moving backing by a slot die and/or the transfer material is in the form of a roll.

4. The method as claimed in, claim 1 or 2 wherein the percentage of the area coated with the resulting film of hot-melt adhesive composition is between 30% and 99%.

5. The method as claimed in claim 1 or 2, wherein the film of the hot-melt pressure sensitive adhesive composition being applied is extended beyond its yield point by tensile and shear forces which are proportional to the speed of the backing material or transfer means, relative to the application rate of the hot-melt pressures sensitive adhesive, and tears, so that the film formed from the hot-melt adhesive composition has voids.

6. The method as claimed in claim 1 or 2 wherein the percentage of the area coated with the resulting film of hot-melt adhesive composition is between 40% to 95%.

7. The method as claimed in claim 1 or 2 wherein the percentage of the area coated with the resulting film of hot-melt adhesive composition is between 50% to 92%.

* * * * *